Oct. 22, 1935.   H. W. HARTMAN ET AL   2,017,861
ELECTRICAL CONDUIT SYSTEM
Original Filed Aug. 22, 1933

Inventors
Howard W. Hartman
AND J. Fearon Brown
By Seymour & Bright
Attorneys

Patented Oct. 22, 1935

2,017,861

UNITED STATES PATENT OFFICE 2,017,861

ELECTRICAL CONDUIT SYSTEM

Howard W. Hartman, South Williamsport, and James F. Brown, Williamsport, Pa.; said Brown assignor to said Hartman Original application August 22, 1933, Serial No. 686,294. Divided and this application March 10, 1934, Serial No. 715,015

6 Claims. (Cl. 247—31)

This invention relates to electrical conduit systems, and more especially to novel means including a junction box for supplying current to conductor units arranged in any suitable place, such as along the baseboard, molding, door frame or the like of a room; and the present application is a division of our application Serial No. 686,294, filed August 22, 1933.

One of the objects of the invention is to provide a juction box having a pivoted end portion, which portion may be placed in alignment with the body of the box while wires are being installed, and afterwards can be moved into a position at right angles to the body to accommodate a conducting cable in a partition or within a wall.

A further object is to combine with such a junction box, a connector unit designed to bridge the gaps between adjacent conducting units arranged in a channel or the like.

With the foregoing objects outlined and with other objects in view which will appear as the description proceeds, the invention consists in the novel features hereinafter described in detail, illustrated in the accompanying drawing, and more particularly pointed out in the appended claims.

Figure 1:
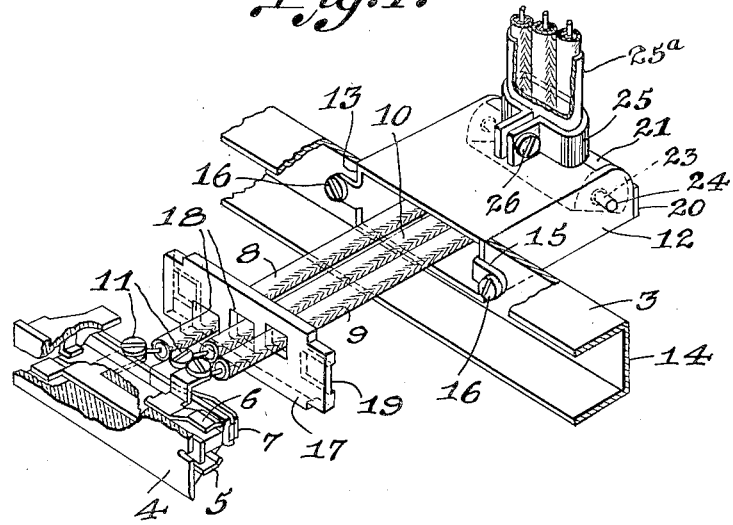
Fig. 1 is a fragmentary perspective view showing a connector unit, partition or cover plate, and our improved junction box combined with a channel designed to receive conductor units of the type disclosed in our above mentioned application.

Referring to the drawing, 3 designates a channel which may be formed of metal and which is designed to be embedded in a baseboard, molding, door frame or the like. This channel may receive insulated slotted tubes, not shown, arranged end to end and carrying a plurality of conductors, three for example.

A connecting unit 4 of insulating material carries a lower conducting shoe 5, an upper conducting shoe 6, and a side shoe 7, designed to bridge the gaps between the adjacent conductors heretofore mentioned. Insulated wires 8, 9 and 10 are electrically connected respectively, to the shoes 5, 6 and 7 by means of screws or the like 11.

The wires extend through a special junction box 12 which projects through a slot 13 in the rear wall 14 of the channel, and has oppositely extending ears 15 that abut against the front surface of the wall 14, and are detachably secured thereto by screws 16.

A partition or cover plate 17 of insulating material, has apertures 18 to accommodate the wires, and the rear surface of this plate has end recesses 19 to receive the ears 15. Consequently, when the plate 17 is closing the front end of the box 12, the shoes 5, 6 and 7 will be in such position as to form the necessary bridges between adjacent conductor units, not shown.

The rear end of the box has a short upstanding wall 20 of less height than the box, and the remainder of the rear end, as well as a portion of the rear end of the top of the box is open. A substantially cylindrical door 21 is provided for the rear open end of the box, and this door has ends 22 from which pintles 23 project. These pintles are pivotally mounted in the side walls of the box to permit the door 21 to swing relatively to the box.

The door carries a clamping tube 25 through which the wires may extend, and the conventional flexible metal cable 25a which encloses the wires may be clamped to this tube by means of a screw 26.

Figure 2:
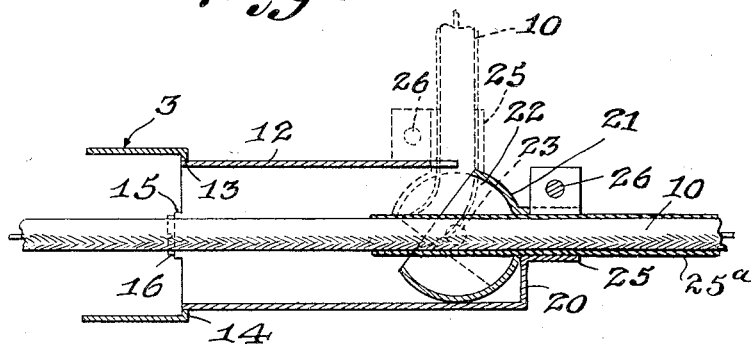
Fig. 2 is a vertical sectional view of the channel and juction box, and showing the pivoted portion of the junction box in such position that a clamping tube of the same is in alignment with the tubular portion of the body of the box.

From the foregoing it will be understood that the wires may be threaded through the tube 25 while the latter is in alignment with the tubular portion of the box, and when the door 21 may be swung so as to bring the tube into a position at right angles to the tubular portion of the box, as indicated in full lines in Fig. 1, and dotted lines in Fig. 2. This will enable the junction box to accommodate a conducting cable in a partition or within a wall.

From the above it is believed that the novel features of the invention may be readily understood by those skilled in the art, and we are aware that changes may be made in the details disclosed without departing from the spirit of the invention, as expressed in the claims.

What is claimed and desired to be secured by Letters Patent is:

1. An electrical conduit system comprising a channel of substantially U-shaped cross section having a web provided with an aperture, a tubular outlet box having its front end detachably secured to said channel, the interior of the box communicating with said aperture and the box being arranged at an angle to said channel, a wall partially closing the rear end of the box, the remainder of said last mentioned end being open, the same end portion of the top of the box being also open, a substantially curved door pivotally mounted in the box and designed to close the rear end of the latter, and a tube carried by the door and adapted to receive electrical conductors.

2. An electrical conduit system comprising a channel of substantially U-shaped cross section having a web provided with an aperture, a tubular outlet box arranged at an angle to the channel and having its interior communicating with said aperture, said outlet box having its front end detachably secured to said channel, a wall partially closing the rear end of the box, the remainder of said rear end being open, the rear end portions of the top of the box being also open, a substantially curved door pivotally mounted in the box and designed to close the rear end of the latter, and a tube carried by the door and adapted to receive electrical conductors, said tube being provided with means for clamping electrical conductors therein.

3. An electrical conduit system comprising a web having an aperture therein, an outlet box extending through said aperture and having an open front end provided with projecting ears, means for detachably securing said ears to said web, a stationary plate partially closing the rear end of the box, a door pivotally secured to the box for closing the partially open rear end of the latter, and means associated with the door to accommodate electrical conductors which pass through said box.

4. An electrical conduit system comprising a web having an aperture therein, an outlet box extending through said aperture and having an open front end provided with projecting ears, means for detachably securing said ears to said web, a stationary plate partially closing the rear end of the box, a door pivotally secured to the box for closing the partially open rear end of the latter, means associated with the door to accommodate electrical conductors which pass through said box, and an apertured plate closing the front end of the box and having recesses in its ends to receive said ears.

5. An electrical conduit system comprising a web having an aperture therein, an outlet box extending through said aperture and having an open front end provided with projecting ears, means for detachably securing said ears to said web, a stationary plate partially closing the rear end of the box, a door pivotally secured to the box for closing the partially open rear end of the latter, means associated with the door to accommodate electrical conductors which pass through said box, a connecting unit positioned forwardly of the box, and an insulated partition plate positioned between the connector unit and said box.

6. An electrical conduit system comprising a channel having an aperture in the web thereof, an outlet box extending through said aperture and having an open end secured to the channel, the opposite end of the box being partially closed by a stationary plate, a second plate closing the remainder of the last mentioned end of the box, the second plate being curved and swiveled to the box, and a clamp ring united with the second plate.

HOWARD W. HARTMAN.
JAMES F. BROWN.